(12) United States Patent
Chuang et al.

(10) Patent No.: US 9,776,362 B2
(45) Date of Patent: Oct. 3, 2017

(54) ADDITIVE MANUFACTURING SYSTEM AND ADDITIVE MANUFACTURING METHOD

(71) Applicant: Industrial Technology Research Institute, Hsinchu (TW)

(72) Inventors: Chuan-Sheng Chuang, Taichung (TW); Ching-Chih Lin, Tainan (TW); Wei-Chin Huang, Tainan (TW); De-Yau Lin, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 377 days.

(21) Appl. No.: 14/609,447

(22) Filed: Jan. 30, 2015

(65) Prior Publication Data

US 2016/0114531 A1   Apr. 28, 2016

(30) Foreign Application Priority Data

Oct. 27, 2014   (TW) .............................. 103137002 A

(51) Int. Cl.
  *B29C 67/00*   (2017.01)
  *B33Y 10/00*   (2015.01)
  (Continued)

(52) U.S. Cl.
  CPC ........ *B29C 67/0077* (2013.01); *B22F 3/1055* (2013.01); *B29C 67/0085* (2013.01);
  (Continued)

(58) Field of Classification Search
  CPC .............................................. B29C 67/0085
  See application file for complete search history.

(56) References Cited

U.S. PATENT DOCUMENTS

| | | |
|---|---|---|
| 5,132,143 A | 7/1992 | Deckard |
| 5,316,580 A | 5/1994 | Deckard |

(Continued)

FOREIGN PATENT DOCUMENTS

| | | |
|---|---|---|
| CN | 101600560 | 12/2009 |
| CN | 101653827 | 2/2010 |

(Continued)

OTHER PUBLICATIONS

"Office Action of Taiwan Counterpart Application", dated Nov. 9, 2015, p. 1-p. 3, in which the listed references were cited.

(Continued)

*Primary Examiner* — Ryan Ochylski
(74) *Attorney, Agent, or Firm* — Jianq Chyun IP Office

(57) ABSTRACT

An additive manufacturing system is provided. The system includes: a stage, a powder supplying device, an energy beam generating device and an atmosphere controlling module. The powder supplying device provides powder to the stage. The energy beam-generating device generates an energy beam and directs the energy beam to the stage. The atmosphere controlling module includes at least one pair of gas inlet-outlet devices coupled around the stage, and a dynamic gas flow controlling device connected with the gas inlet-outlet devices. The dynamic gas flow controlling device dynamically controls an angle between a flow direction of the gas and a moving direction of the energy beam. The angle is predetermined by a scanning strategy.

20 Claims, 12 Drawing Sheets

(51) Int. Cl.
  *B33Y 30/00* (2015.01)
  *B22F 3/105* (2006.01)
  *B33Y 50/02* (2015.01)

(52) U.S. Cl.
  CPC .......... *B29C 67/0088* (2013.01); *B33Y 10/00* (2014.12); *B33Y 30/00* (2014.12); *B33Y 50/02* (2014.12); *B22F 2003/1056* (2013.01); *B22F 2003/1057* (2013.01); *Y02P 10/295* (2015.11)

(56) References Cited

U.S. PATENT DOCUMENTS

| | | | |
|---|---|---|---|
| 5,597,589 | A | 1/1997 | Deckard |
| 5,616,294 | A | 4/1997 | Deckard |
| 5,639,070 | A | 6/1997 | Deckard |
| 5,876,767 | A | 3/1999 | Mattes et al. |
| 6,583,379 | B1 | 6/2003 | Meiners et al. |
| 7,807,947 | B2 | 10/2010 | Partanen et al. |
| 7,854,227 | B2 * | 12/2010 | Djupesland ....... A61M 15/0086 128/203.15 |
| 7,946,840 | B2 | 5/2011 | Perret et al. |
| 8,062,020 | B2 | 11/2011 | Abe et al. |
| 8,187,522 | B2 | 5/2012 | Higashi et al. |
| 8,562,897 | B2 | 10/2013 | Abe et al. |
| 8,585,853 | B2 | 11/2013 | Yamamoto et al. |
| 2006/0192322 | A1 | 8/2006 | Abe et al. |
| 2008/0138513 | A1 | 6/2008 | Perret et al. |
| 2010/0044547 | A1 | 2/2010 | Higashi et al. |
| 2012/0139166 | A1 | 6/2012 | Abe et al. |
| 2014/0077422 | A1 | 3/2014 | Minick |
| 2016/0279706 | A1 * | 9/2016 | Domrose ............. B22F 3/1055 |

FOREIGN PATENT DOCUMENTS

| | | |
|---|---|---|
| CN | 102164696 | 8/2011 |
| DE | 287657 | 8/1994 |
| DE | 3750931 | 5/1995 |
| DE | 29513026 | 10/1995 |
| DE | 3751818 | 9/1996 |
| DE | 3751819 | 9/1996 |
| DE | 19853947 | 2/2000 |
| DE | 102006055073 | 5/2008 |
| DE | 102009038241 | 3/2010 |
| DE | 112004000301 | 5/2010 |
| DE | 502007006362 | 3/2011 |
| EP | 0287657 | 10/1988 |
| EP | 0538244 | 4/1993 |
| EP | 0542729 | 5/1993 |
| EP | 0785838 | 7/1997 |
| EP | 1137504 | 10/2001 |
| EP | 1963078 | 9/2008 |
| TW | 466183 | 12/2001 |
| TW | 590892 | 6/2004 |
| TW | 200706394 | 2/2007 |
| WO | 8802677 | 4/1988 |
| WO | 9706918 | 2/1997 |
| WO | 0030789 | 6/2000 |
| WO | 2004076102 | 9/2004 |
| WO | 2008061732 | 5/2008 |

OTHER PUBLICATIONS

Mukesh Agarwala, et al., "Direct selective laser sintering of metals," Rapid Prototyping Journal, vol. 1, Issue 1, Mar. 1995, pp. 26-36.

Ruidi Li, et al., "Densification behavior of gas and water atomized 316L stainless steel powder during selective laser melting," Applied Surface Science, vol. 256, Issue 13, Apr. 15, 2010, pp. 4350-4356.

Eleftherios Louvis, et al., "Selective laser melting of aluminium components," Journal of Materials Processing Technology, vol. 211, Issue 2, Feb. 1, 2011, pp. 275-284.

Wen-Hsien Hsu, et al., "Parametric study on the interface pullout strength of the vertebral body replacement cage using FEM-based Taguchi methods," Medical Engineering & Physics, vol. 31, Apr. 2009, pp. 287-294.

B. Ferrara, et al., "Gas flow effects on selective laser melting (SLM) manufacturing performance," Journal of Materials Processing Technology, vol. 212, Issue 2, Feb. 2012, pp. 355-364.

Chi Chung Ng, et al., "Fabrication of magnesium using selective laser melting technique," Rapid Prototyping Journal, vol. 17, Issue 6, Sep. 2011, pp. 479-490.

* cited by examiner

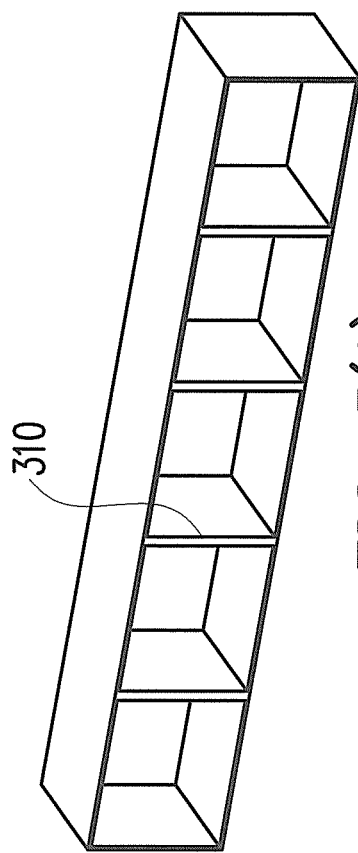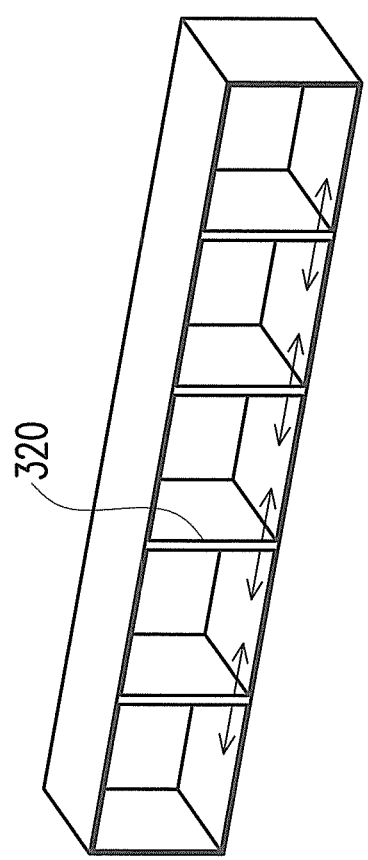

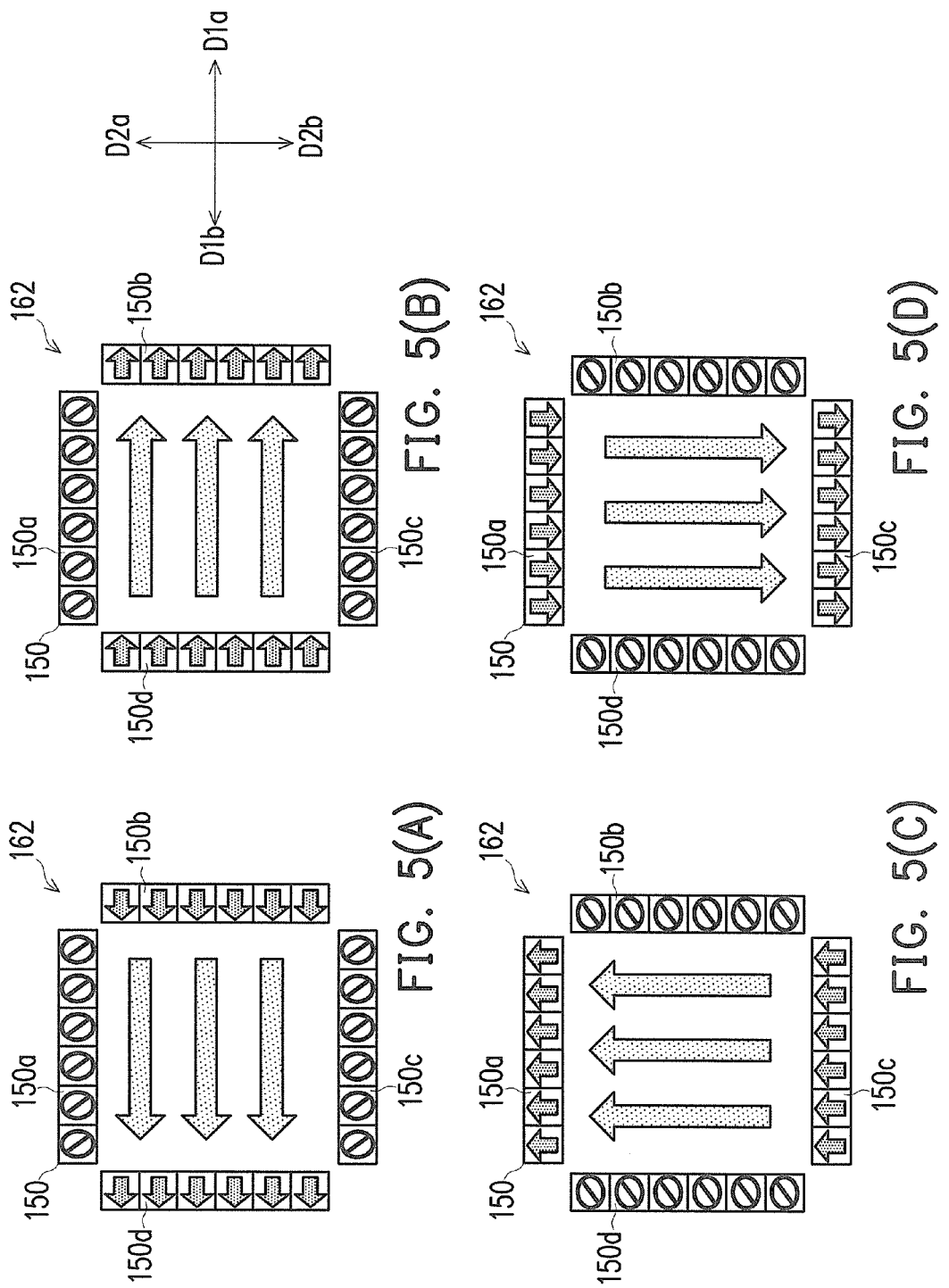

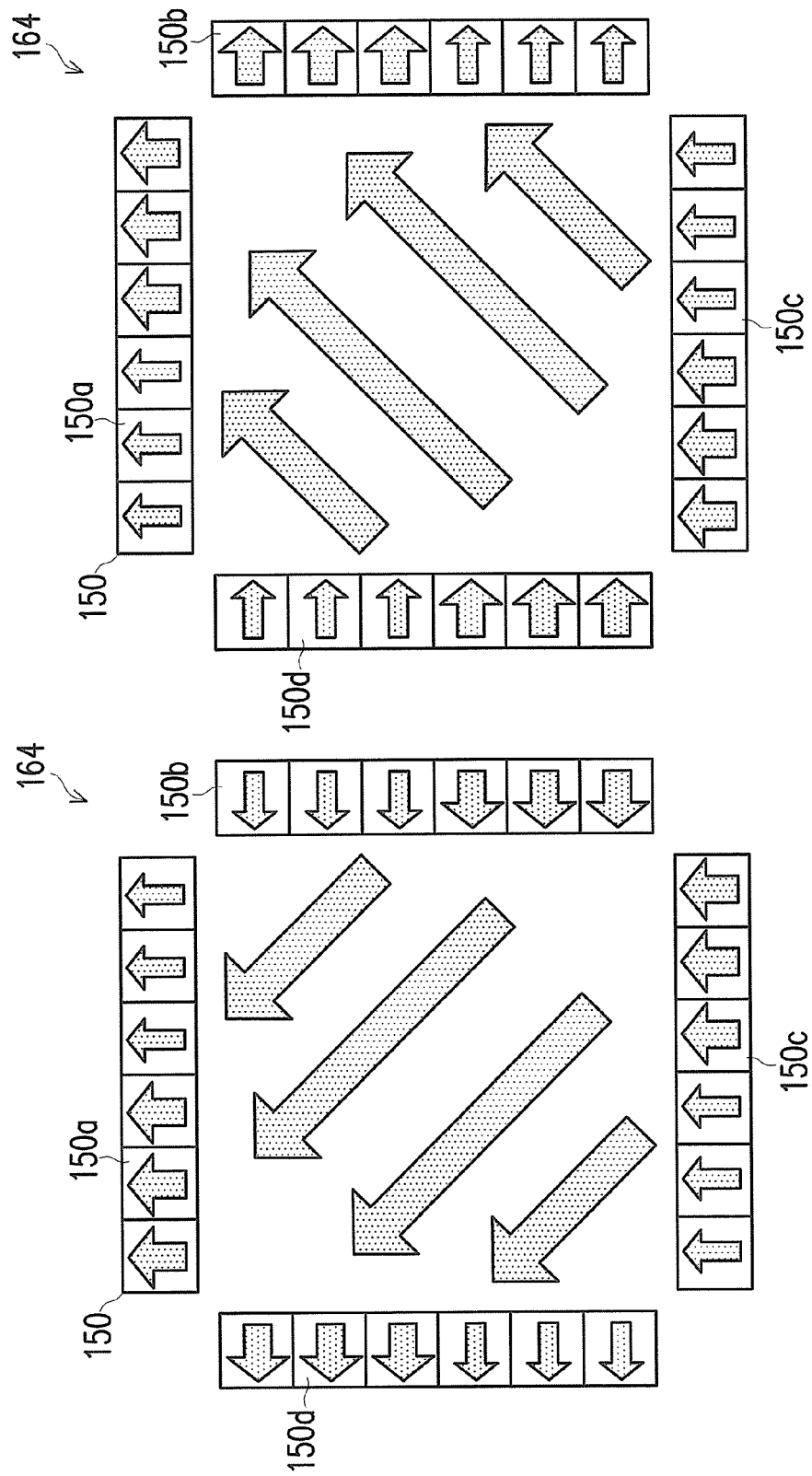

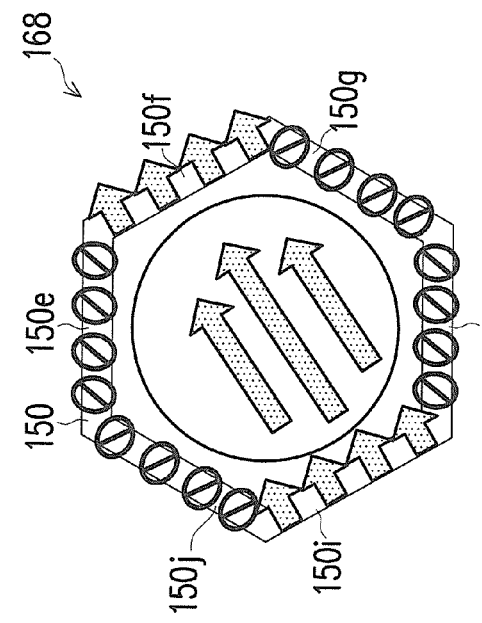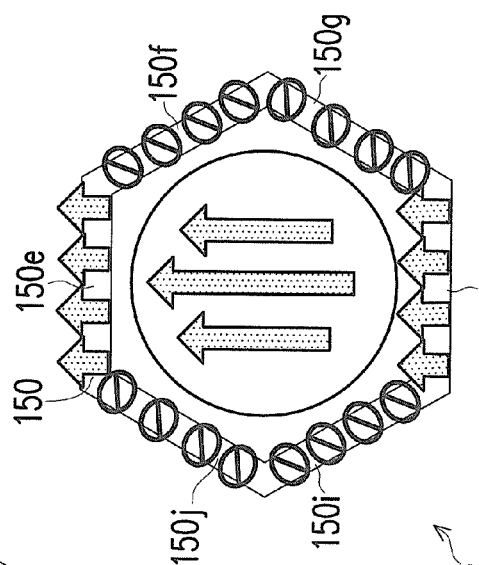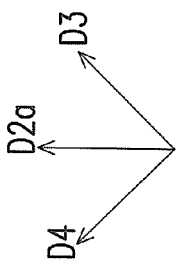

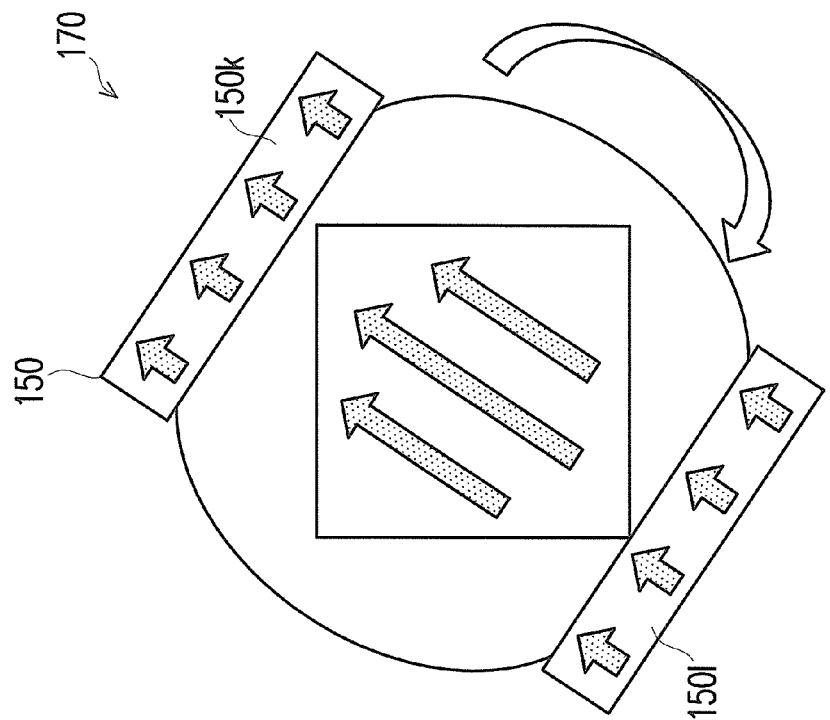
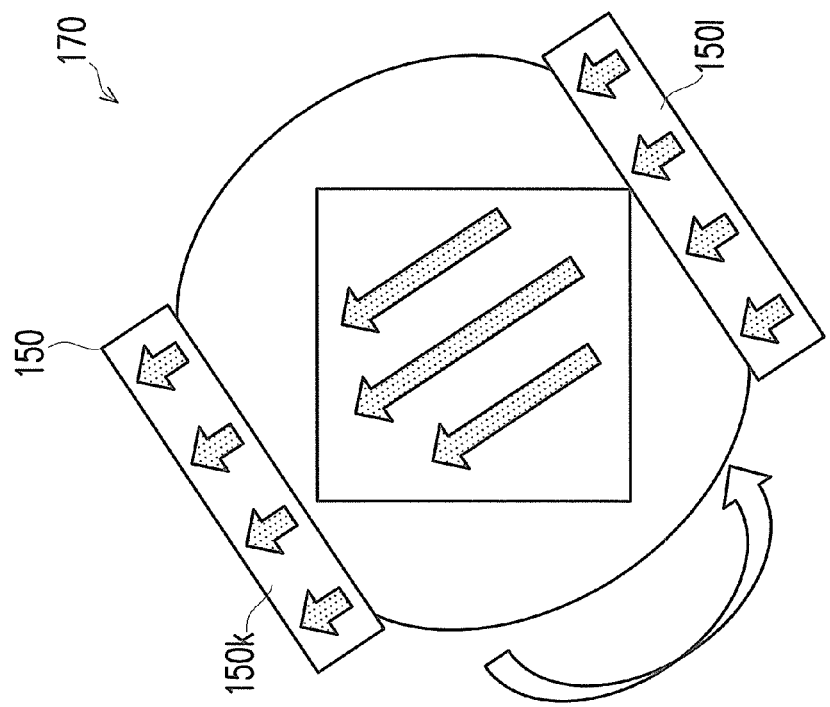

ADDITIVE MANUFACTURING SYSTEM AND ADDITIVE MANUFACTURING METHOD

CROSS-REFERENCE TO RELATED APPLICATION

This application claims the priority benefit of Taiwan application serial no. 103137002, filed on Oct. 27, 2014. The entirety of the above-mentioned patent application is hereby incorporated by reference herein and made a part of this specification.

TECHNICAL FIELD

The disclosure relates to an additive manufacturing system and an additive manufacturing method.

BACKGROUND

Additive manufacturing (AM) or three-dimensional printing has a special strategic position in the global competition. Therefore, the leading countries have been devoting efforts to develop such technology, so as to make improvement from the conventional manufacturing condition and enhance the advantages in global competition. The conventional additive manufacturing technology mainly focuses on the technology of laser additive manufacturing. The technology of laser additive manufacturing makes use the principle of laser melting, divides an item into layers of two-dimensional geometric figures according to a three-dimensional model, forms a powder layer by using a layering device, focuses a laser beam on the powder layer, performs a melt forming process according to the two-dimensional figure as required, and then sequentially stacks the layers into a three-dimensional product. In this way, a complicated structure that cannot be manufactured by using the conventional processing techniques can be accomplished.

However, the laser additive manufacturing technology faces the challenges of having a low production efficiency, needing improvement on the product quality, having difficulties to guarantee the stability of production, having only limited types of metal materials, and having difficulties to reduce the cost of materials and facilities, etc. One of the reasons why the product quality is degraded is that slag and oxides produced during the process of additive manufacturing fall back to a processing area where the melt forming process is not performed, making the product contains impurities and oxides.

Based on the above, the technology of additive manufacturing capable of preventing slag and oxides from falling back to the processing area where the melt forming process is not performed is certainly needed to improve the forming quality and stability of additive manufacturing.

SUMMARY

The disclosure provides an additive manufacturing system and an additive manufacturing method capable of preventing slag and oxides from falling back to a processing area where the melt forming process is not performed, so as to provide an additive manufacturing technology for improving a forming quality and stability of additive manufacturing.

The disclosure provides an additive manufacturing system, including: a stage; a powder supplying device, providing powder to a surface of the stage; an energy beam generating device, generating an energy beam and directing the energy beam to the stage; and an atmosphere controlling module, including at least a pair of gas inlet-outlet devices coupled around the stage and a dynamic gas flow controlling device connected to the gas inlet-outlet devices. The dynamic gas flow controlling device dynamically controls an angle between a flow direction of the gas and a moving direction of the energy beam by a predetermined scanning strategy.

The disclosure also provides an additive manufacturing method, including: providing powder onto a target surface; irradiating the powder with an energy beam and directing the energy beam on the powder to form a solidified layer; providing a gas to the surface of the stage; dynamically controlling an angle between a flow direction of the gas and a moving direction of the energy beam, wherein the angle is predetermined by a scanning strategy; and repetitively performing the above-mentioned steps until a plurality of the solidified layers formed accordingly accumulate into a three-dimensional product.

Based on the above, in the embodiments of the disclosure, the angle between the moving direction and the flow direction of the gas can be dynamically controlled by using the atmosphere controlling module during the process of additive manufacturing, so as to prevent slag and oxides from falling back to the processing area where the melt forming process is not performed, thereby improving a forming quality and stability of additive manufacturing.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIGS. 3(A) to 3(B) are schematic views illustrating several structures of gas inlet-outlet devices according to embodiments of the disclosure.

FIGS. 5(A) to 5(D) are schematic views illustrating several gas flow direction controlling methods according to a first embodiment of the disclosure.

FIGS. 6(A) to 6(B) are schematic views illustrating several gas flow direction controlling methods according to a second embodiment of the disclosure.

FIGS. 8(A) to 8(C) are schematic views illustrating several gas flow direction controlling methods according to a fourth embodiment of the disclosure.

FIGS. 9(A) to 9(B) are schematic views illustrating several gas flow direction controlling methods according to a fifth embodiment of the disclosure.

DETAILED DESCRIPTION OF DISCLOSED EMBODIMENTS

Figure 1:
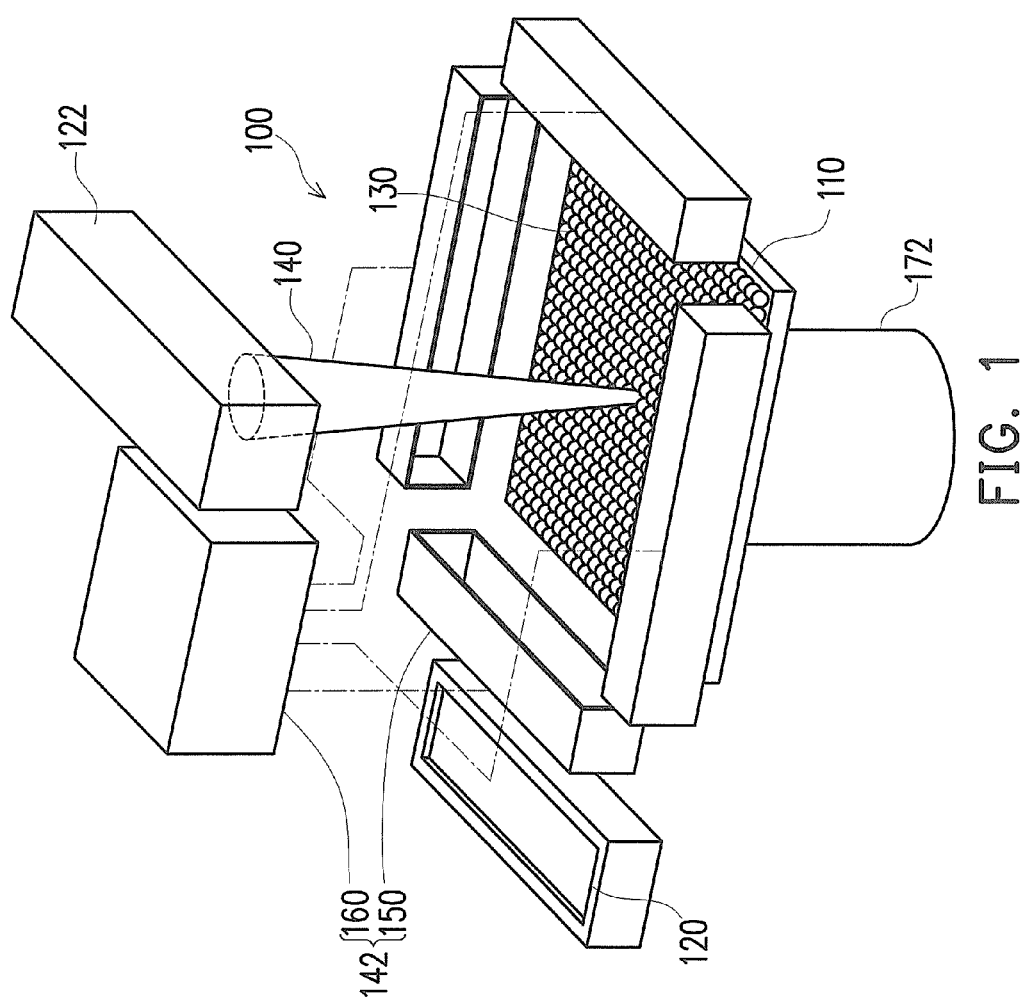
FIG. 1 is a schematic view illustrating an additive manufacturing system according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As set forth above, one of the reasons why the quality of products manufactured by using the laser additive manufacturing technology is degraded is that slag and oxides produced during the process of additive manufacturing fall back to a processing area where the melt forming process is not performed, making the products contain impurities and oxides. The phenomenon that slag and oxides fall back to the processing area where the melt forming process is not performed is considered to be related to an angle between a flow direction of a gas and a laser moving direction. Specifically, when the flow direction of the gas and the moving direction are the same (i.e., the angle therebetween is 0 degrees), a significant amount of slag is contained in the product. On the other hand, when the flow direction of the gas and the moving direction are opposite (i.e., the angle therebetween is 180 degrees), the amount of slag is significantly reduced. Thus, it can be known that controlling the flow direction of the gas helps improve the quality of the product of additive manufacturing.

However, additive manufacturing systems providing gas in a fixed flow direction are dominantly used in relevant technical fields, and such systems are unable to match with the laser moving direction and make adjustment accordingly. Consequently, when the flow direction of the gas and the moving direction are the same (or nearly the same), slag and oxides tend to fall back to the processing area where the forming process is not performed, making the product contain impurities and oxides.

In view of the aforesaid situation, the embodiments of the disclosure provide an additive manufacturing system and an additive manufacturing method capable of adjusting the flow direction of the gas in correspondence with the moving direction to effectively and dynamically control the angle between the flow direction of the gas and the moving direction by a predetermined scanning strategy. Based on a technical solution provided in the disclosure, the angle between the flow direction of the gas and the moving direction can be dynamically controlled within a range as required to prevent the slag and oxides from falling back to the processing area where the melt forming process is not performed thereby improving a forming quality and stability of additive manufacturing.

In the following, specific details of the additive manufacturing system and the additive manufacturing method of the disclosure are described.

FIG. 1 is a schematic view illustrating an additive manufacturing system according to an embodiment of the disclosure.

Referring to FIG. 1, an additive manufacturing system 100 of the disclosure includes: a stage 110, a powder supplying device 120, an energy beam generating device 122, and an atmosphere controlling device 142. The stage 110 is a stage carrying powder without being processed. The stage 110 may be a flat surface, a curved surface, or an irregular surface, and there is no specific limitation on the stage 110.

The powder supplying device 120 provides the powder on the stage (target surface) 110 to form a powder layer 130. The powder may be formed of an inorganic material, a polymer material or a combination thereof, for example. The inorganic material is a metal material, a ceramic material, or a combination thereof, for example. The polymer material may be nylon, polyetheretherketone (PEEK), polyaryletheretherketone (PEAK), or a combination thereof, for example. An average particle size of the powder is in a range of 15 μm to 50 μm, for example.

The energy beam generating device 122 generates an energy beam 140 and directs the energy beam 140 to the surface of the stage 110. Specifically, the energy beam generating device 122 generates the energy beam 140 by using an energy beam generating source (not shown), for example, and uses an optical or electromagnetic lens (not shown) to focus the energy beam 140 on the surface of the stage 110 to perform a selective melt forming process to the powder (powder layer 130). The energy beam 140 is a laser beam, an electron beam or a combination thereof, for example. In an embodiment, an energy density of the energy beam 140 is in a range of 0.1 J/mm$^2$ to 100 J/mm$^2$. However, the disclosure is not limited thereto. In an embodiment, a scanning speed of the energy beam 140 is in a range of 50 mm/sec to 2000 mm/sec. However, the disclosure is not limited thereto. In an embodiment, a focus light spot of the energy beam 140 is in a range of 1 μm to 10,000 μm. However, the disclosure is not limited thereto.

The atmosphere controlling module 142 includes at least a pair of gas inlet-outlet devices 150 and a dynamic gas flow controlling device 160. The gas inlet-outlet devices 150 are coupled around the stage 110 to provide the gas to the surface of the stage 110. The dynamic gas flow controlling device 160 is connected with the gas inlet-outlet devices 150 and capable of dynamically controlling the angle between a flow direction of the gas and a moving direction of the energy beam 140 by a predetermined scanning strategy.

FIGS. 2(A) to 2(D) are schematic views illustrating distributions of gas inlet-outlet devices according to embodiments of the disclosure. In the following, specific structures and functions of the gas inlet-outlet device 150 and the dynamic gas flow controlling device 160 are described.

Figure 2B:
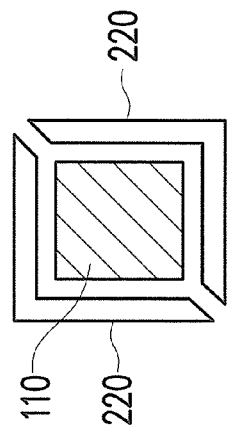
FIGS. 2(A) to 2(D) are schematic views illustrating several distributions of gas inlet-outlet devices according to embodiments of the disclosure.
Figure 2D:
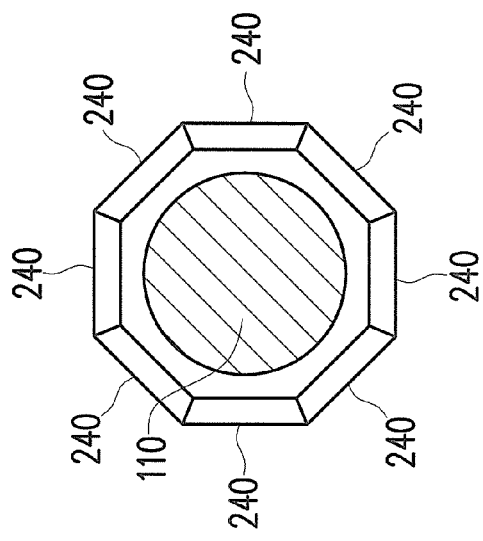
Figure 2A:
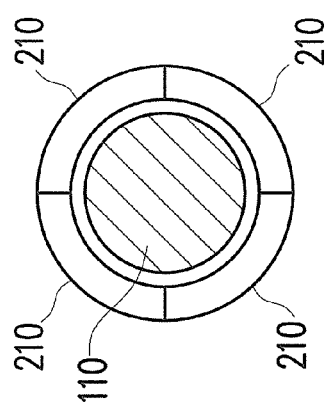
Figure 2C:
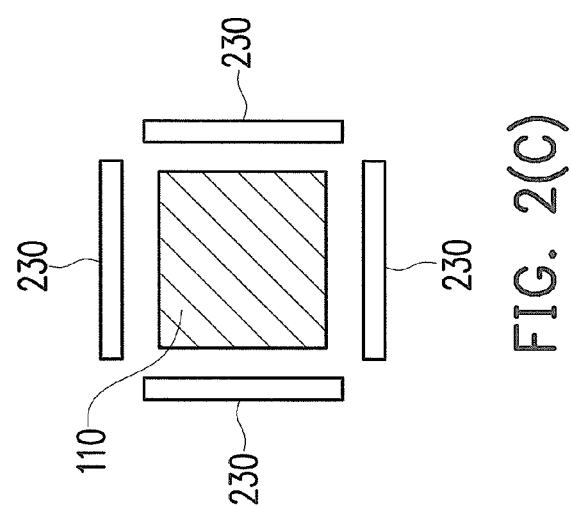

Referring to FIGS. 2(A) to 2(D), the gas inlet-outlet devices 150 of the disclosure are arranged to be separate or adjacent with respect to each other and in a circular, square, or polygonal arrangement. For example, the gas inlet-outlet devices 150 may be specifically arranged as follows: quartiles forming a circle 210 (as shown in FIG. 2(A)), two L shapes 220 symmetrical to each other (as shown in FIG. 2(B)), a square 230 (as shown in FIG. 2(C)), or an octagon 240 (as shown in FIG. 2(D)), etc. It should be noted that the arrangement of the gas inlet-outlet devices 150 of the disclosure is not limited by the aforesaid specific arrangements. As long as it is ensured that the flow direction of the gas provided by the gas inlet-outlet devices 150 is adjusted to a direction as required, the inlet-outlet devices 150 may be arranged to be separate or adjacent with respect to each other and in an arbitrary arrangement.

Figure 4D:
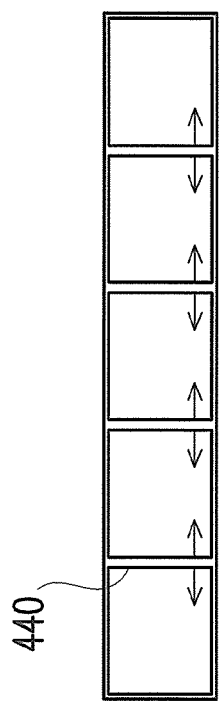
FIGS. 4(A) to 4(E) are cross-sectional views illustrating several gas inlet-outlet devices according to embodiments of the disclosure.
Figure 4E:
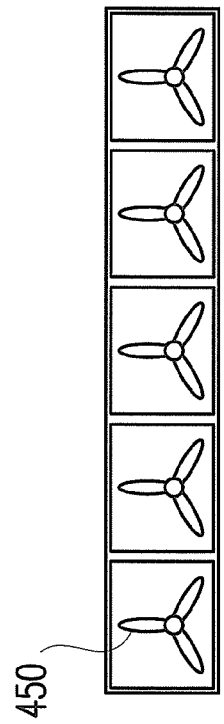
Figure 4A:
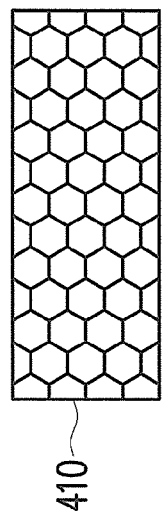
Figure 4B:
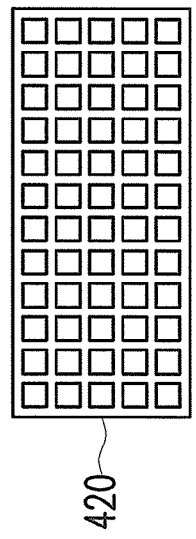
Figure 4C:
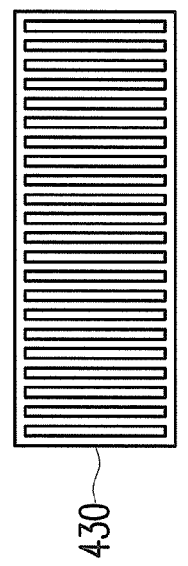

FIGS. 3(A) to 3(B) are schematic views illustrating structures of the gas inlet-outlet devices according to embodiments of the disclosure. FIGS. 4(A) to 4(E) are cross-sectional views illustrating the gas inlet-outlet devices according to embodiments of the disclosure. Referring to FIGS. 3(A) and 3(B) and FIGS. 4(A) to 4(E), the gas inlet-outlet devices 150 of the disclosure include a plurality of blocks divided up by a plurality of partition plates. The partition plates are fixed partition plates 310 (as shown in FIG. 3(A), for example, or movable vanes 320 (i.e., guiding plates, as shown in FIG. 3(B)), for example. It should be noted that as long as it is ensured that the flow direction of the gas provided by the gas inlet-outlet devices 150 is adjusted to the direction as required, the partition plates may not be disposed in the gas inlet-outlet devices 150. In addition, a cross-sectional structure of the gas inlet-outlet device 150 may be configured in a structure of honeycombs 410 (as shown in FIG. 4(A)), grids 420 (as shown in FIG. 4(B)), voids 430 (as shown in FIG. 4(C)), vanes 440 (as shown in FIG. 4(D)), fan blades 450 (as shown in FIG. 4(E)), or a combination thereof. However, the disclosure is not limited thereto. As long as it is ensured that the flow direction of the gas provided by the gas inlet-outlet devices 150 may be adjusted to the direction as required, the cross-sectional structure of the gas inlet-outlet device 150 may be an arbitrary structure other than the aforesaid structures. In the following, several specific configurations concerning the structures and arrangements of the gas inlet-outlet devices 150 for adjusting the flow direction of the gas are described. However, the disclosure does not intend to limit the specific configurations. Components may be freely combined limitation as long as the combination does not depart from the spirit of the disclosure.

FIGS. 5(A) to 5(D) are schematic views illustrating gas flow direction controlling methods according to a first embodiment of the disclosure.

Referring to FIGS. 1, 3(A) to 3(B), 4(A) to 4(E) and 5(A) to 5(D) at the same time, in the first embodiment of the disclosure, the dynamic gas flow controlling device 160 includes a gas inlet-outlet switch device 162. The gas inlet-outlet switch device 162 dynamically controls to turn on or off the gas inlet-outlet devices 150. Specifically, the gas inlet-outlet devices of the first embodiment are formed by arranging gas inlet-outlet gas devices 150a, 150b, 150c, and 150d as a square. In addition, through operation of the gas inlet-outlet devices and setting of supplying and extracting gas, the angle between the flow direction of the gas and the moving direction of the energy beam 140 may be adjusted. For example, when the gas inlet-outlet devices 150a and 150c are not operational, the gas inlet-outlet device 150b supplies gas, and the gas inlet-outlet device 150d extracts gas, the gas may flow in a second direction D1b (as shown in FIG. 5(A)). Alternatively, if the gas inlet-outlet devices 150a and 150c are not operational, the gas inlet-outlet device 150d supplies gas, and the gas inlet-outlet device 150b extracts gas, the gas may flow in a first direction D1a (as shown in FIG. 5(B)). In addition, the gas inlet-outlet switch device 162 may also make the gas inlet-outlet devices 150b and 150d not operational, the gas inlet-outlet device 150c supply gas, and the gas inlet-outlet device 150a extracts gas, so as to make the gas flow in a third direction D2a (as shown in FIG. 5(C)). Moreover, the gas inlet-outlet switch device 162 may make the gas inlet-outlet devices 150b and 150d not operational, the gas inlet-outlet device 150a supply gas, and the gas inlet-outlet device 150c extracts gas, so as to make the gas flow in a fourth direction D2b (as shown in FIG. 5(D)). Besides, the gas inlet-outlet switch device 162 may also make the gas inlet-outlet devices that are operational extract and supply gas alternately by making valves of the gas inlet-outlet devices 150a, 150b, 150c, and 150d open or closed or adjusting rotating directions of fans of the gas inlet-outlet devices 150a, 150b, 150c, and 150d, such that the flow directions of the gas before and after the adjustment differ at a specific angle.

FIGS. 6(A) to 6(B) are schematic views illustrating gas flow direction controlling methods according to a second embodiment of the disclosure. Referring to FIGS. 1, 3(A) to 3(B), 4(A) to 4(E) and 6(A) to 6(B) at the same time, in the second embodiment of the disclosure, the dynamic gas flow controlling device 160 includes a gas flow speed adjustment device 164. The gas flow speed adjustment device 164 can dynamically control a flow speed of the gas. Specifically, the gas inlet-outlet devices of the second embodiment are formed by arranging the gas inlet-outlet gas devices 150a, 150b, 150c, and 150d as a square. In addition, the gas inlet-outlet gas devices 150a, 150b, 150c, and 150d include the blocks divided up by the partition plates (as shown in FIGS. 3(A) to 3(B)). The gas flow speed adjustment device 164 can change the flow direction of the gas by increasing or decreasing the gas flow speed in some blocks in the gas inlet-outlet gas devices 150a, 150b, 150c, and 150d, so as to change the angle between the flow direction of the gas and the moving direction of the energy beam 140. Besides, the gas flow speed adjustment device 164 of the second embodiment may also make the gas inlet-outlet devices extract and supply gas alternately by making the valves of the gas inlet-outlet devices 150a, 150b, 150c, and 150d open or closed or open or closed to a certain extent, or by adjusting the rotating directions of the fans of the gas inlet-outlet devices 150a, 150b, 150c, and 150d, such that the flow directions of the gas before and after the adjustment differ at a specific angle. For example, referring to FIG. 6(A), the valves at the left side of the gas inlet-outlet device 150a are dynamically controlled to be more open than the valves at the right side of the gas inlet-outlet device 150a, the valves at the right side of the gas inlet-outlet device 150c are dynamically controlled to be more open than the valves at the left side of the gas inlet-outlet device 150c, the valves at the lower side of the gas inlet-outlet device 150b are dynamically controlled to be more open than the valves at the upper side of the gas inlet-outlet device 150b, and the valves at the upper side of the gas inlet-outlet device 150d are dynamically controlled to be more open than the valves at the lower side of the gas inlet-outlet device 150d. By making the gas inlet-outlet devices 150b and 150c supply gas and the gas inlet-outlet devices 150a and 150d extract gas, the gas can flow in a flow direction from the lower right to the upper left. Alternatively, referring to FIG. 6(B), the valves at the left side of the gas inlet-outlet device 150a are dynamically controlled to be more closed than the valves at the right side of the gas inlet-outlet device 150a, the valves at the right side of the gas inlet-outlet device 150c are dynamically controlled to be more closed than the valves at the left side of the gas inlet-outlet device 150c, the valves at the lower side of the gas inlet-outlet device 150b are dynamically controlled to be more closed than the valves at the upper side of the gas inlet-outlet device 150b, and the valves at the upper side of the gas inlet-outlet device 150d are dynamically controlled to be more closed than the valves at the lower side of the gas inlet-outlet device 150d. By making the gas inlet-outlet devices 150c and 150d supply gas and the gas inlet-outlet devices 150a and 150b extract gas, the gas can flow in a flow direction from the lower left to the upper right. Nevertheless, the disclosure is not limited thereto.

Figure 7B:
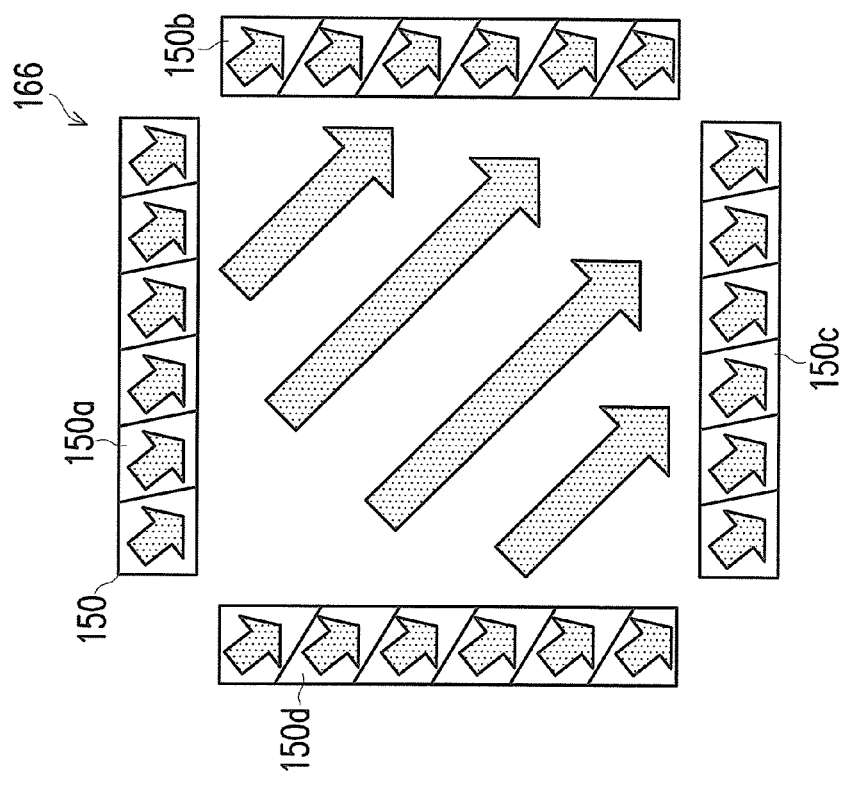
FIGS. 7(A) to 7(B) are schematic views illustrating several gas flow direction controlling methods according to a third embodiment of the disclosure.
Figure 7A:
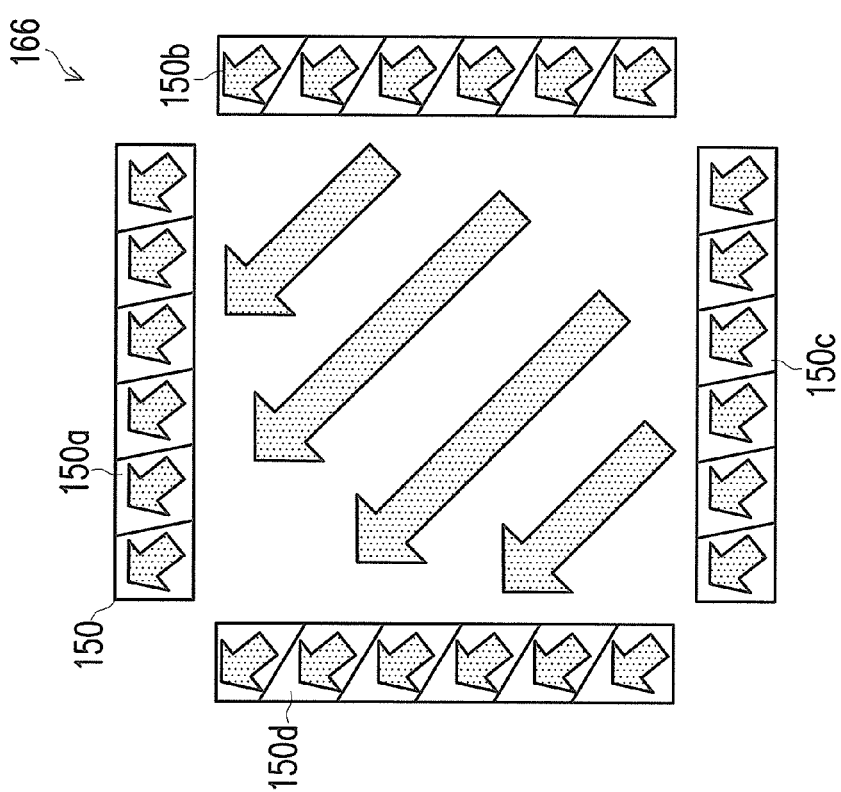

FIGS. 7(A) to 7(B) are schematic views illustrating gas flow direction controlling methods according to a third embodiment of the disclosure. Referring to FIGS. 1, 3(A) to 3(B), 4(A) to 4(E) and 7(A) to 7(B) at the same time, in the third embodiment of the disclosure, the dynamic gas flow controlling device 160 includes a gas flow direction adjustment device 166. The gas flow direction adjustment device 166 dynamically controls the flow direction of the gas. Specifically, the gas inlet-outlet devices 150 of the third embodiment are formed by arranging the gas inlet-outlet devices 150a, 150b, 150c, and 150d as a square. Also, the gas inlet-outlet devices 150a, 150b, 150c, and 150d include the blocks divided up by the movable vanes 320 (i.e., guiding plates, as shown in FIG. 3(B)). The gas flow direction adjustment device 166 can change the flow direction of the gas by adjusting directions of the movable vanes 320, so as to change the angle between the flow direction of the gas and the moving direction of the energy beam 140. Referring to FIG. 7(A), in an embodiment, the gas inlet-outlet devices 150a, 150b, 150c, and 150d include the blocks divided up by the partition plates. The partition plates are the movable vanes 320 (as shown in FIG. 3(B)), for example. By making the movable vanes 320 inclined in a direction from the lower right to the upper left and making the gas inlet-outlet devices 150b and 150c supply gas and the gas inlet-outlet devices 150a and 150d extract gas, the gas can flow in the flow direction from the lower right to the upper left. Referring to FIG. 7(B), alternatively, by still making the movable vanes 320 inclined in a direction from the lower right to the upper left and making the gas inlet-outlet devices 150a and 150d supply gas and the gas inlet-outlet devices 150b and 150c extract gas, the gas can flow in the flow direction from the upper left to the lower right. Nevertheless, the disclosure is not limited thereto. The gas flow direction adjustment device 166 of the third embodiment may also make the gas inlet-outlet devices extract and supply gas alternately by making the valves of the gas inlet-outlet devices 150a, 150b, 150c, and 150d open or closed or adjusting the rotating directions of the fans of the gas inlet-outlet devices 150a, 150b, 150c, and 150d, such that the flow directions of the gas before and after the adjustment differ at a specific angle.

FIGS. 8(A) to 8(C) are schematic views illustrating gas flow direction controlling methods according to a fourth embodiment of the disclosure. Referring to FIGS. 1, 3(A) to 3(B), 4(A) to 4(E) and 8(A) to 8(C) at the same time, in the fourth embodiment of the disclosure, the dynamic gas flow controlling device 160 includes a gas inlet-outlet switch device 168. The gas inlet-outlet switch device 168 dynamically controls to turn on or off the gas inlet-outlet devices. Specifically, the gas inlet-outlet devices 150 of the fourth embodiment are formed by arranging gas inlet-outlet gas devices 150e, 150f, 150g, 150h, 150i, and 150j as a hexagon. In addition, through operation of the gas inlet-outlet devices and setting of supplying and extracting gas, the angle between the flow direction of the gas and the moving direction of the energy beam 140 can be adjusted. For example, when the gas inlet-outlet devices 150e, 150f, 150h, and 150i are not operational, the gas inlet-outlet device 150g supplies gas, and the gas inlet-outlet device 150j extracts gas, the gas can flow in a sixth direction D4 (as shown in FIG. 8(A)). Alternatively, if the gas inlet-outlet devices 150e, 150g, 150h and 150j are not operational, the gas inlet-outlet device 150i supplies gas, and the gas inlet-outlet device 150f extracts gas, the gas can flow in a fifth direction D3 (as shown in FIG. 8(B)). In addition, the gas inlet-outlet switch device 168 may also make the gas inlet-outlet devices 150f, 150g, 150i and 150j not operational, the gas inlet-outlet device 150h supply gas, and the gas inlet-outlet device 150e extract gas, so as to make the gas flow in the third direction D2a (as shown in FIG. 8(C)). Besides, the gas inlet-outlet switch device 168 may also make the gas inlet-outlet devices that are operational extract and supply gas alternately by making valves of the gas inlet-outlet devices 150e, 150f, 150g, 150h, 150i, and 150j open or closed or adjusting rotating directions of fans of the gas inlet-outlet devices 150e, 150f, 150g, 150h, 150i, and 150j, such that the flow directions of the gas before and after the adjustment differ at a specific angle.

FIGS. 9(A) to 9(B) are schematic views illustrating gas flow direction controlling methods according to a fifth embodiment of the disclosure. Referring to FIGS. 1, 3(A) to 3(B), 4(A) to 4(E) and 9(A) to 9(B) at the same time, in the fifth embodiment of the disclosure, the additive manufacturing system 100 further includes a first rotating mechanism 170 connected to the gas inlet-outlet devices 150. The first rotating mechanism 170 is connected to the dynamic gas flow controlling device 160 and makes the gas inlet-outlet devices 150 rotate around the stage 110. Specifically, the gas inlet-outlet devices of the fifth embodiment are formed by a pair of gas inlet-outlet devices 150k and 150l arranged oppositely. In addition, by making the gas inlet-outlet devices 150k and 150l connected to the first rotating mechanism 170 rotate around the surface of the stage 110, the flow direction of the gas can be adjusted at will, so as to change the angle between the flow direction of the gas and the moving direction of the energy beam 140. In an embodiment, referring to FIG. 9(A), the gas inlet-outlet device 150l supplies gas, and the gas inlet-outlet device 150k extracts gas. By rotating the first rotating mechanism 170 in a counterclockwise direction, the gas can flow in a direction toward the upper left. In another embodiment, referring to FIG. 9(B), the gas inlet-outlet device 150l supplies gas, and the gas inlet-outlet device 150k extracts gas. By rotating the first rotating mechanism 170 in a clockwise direction, the gas can flow in a direction toward the upper right instead. By making the gas inlet-outlet devices 150k and 150l rotate around the surface of the stage 110, the flow direction of the gas can be freely adjusted even though one pair of gas inlet-outlet devices are coupled. In this way, the design difficulty of the device is effectively lowered.

Figure 10B:
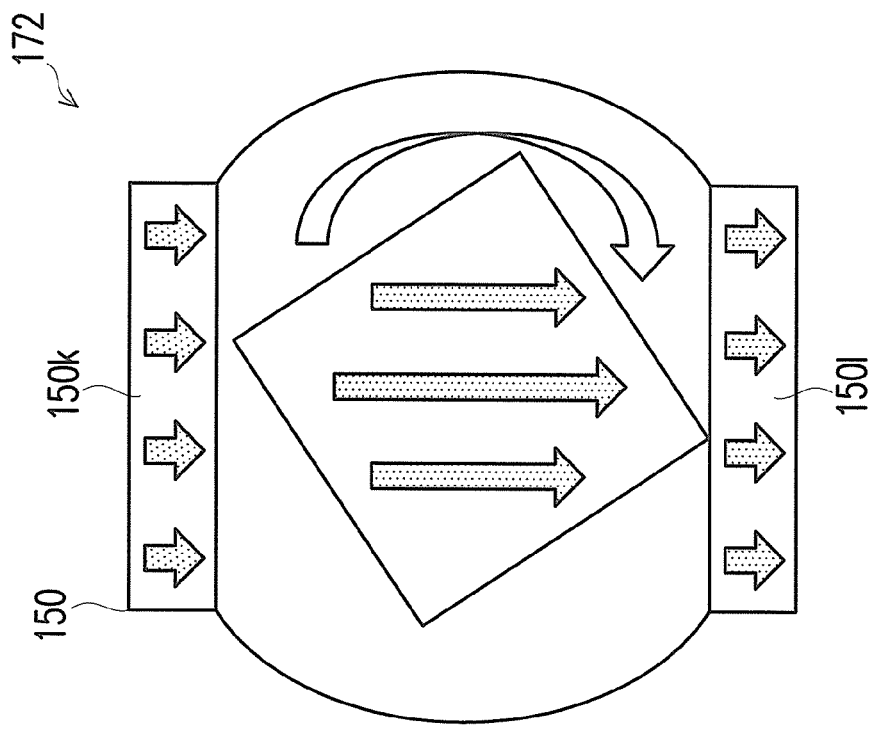
FIGS. 10(A) to 10(B) are schematic views illustrating several gas flow direction controlling methods according to a sixth embodiment of the disclosure.
Figure 10A:
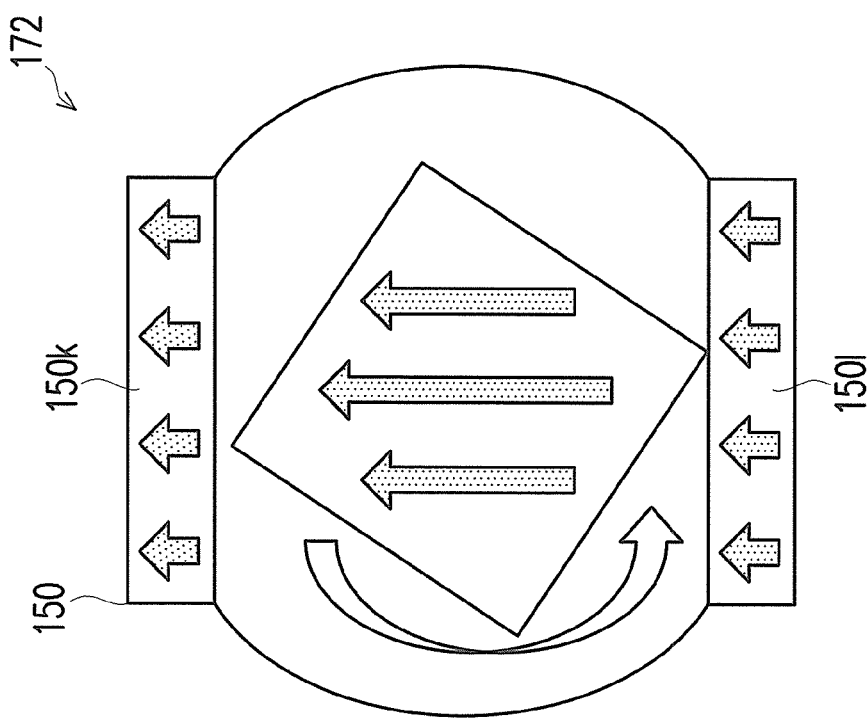

FIGS. 10(A) to 10(B) are schematic views illustrating gas flow direction controlling methods according to a sixth embodiment of the disclosure. Referring to FIGS. 1, 3(A) to 3(B), 4(A) to 4(E) and 10(A) to 10(B) at the same time, in the sixth embodiment of the disclosure, the additive manufacturing system 100 further includes a second rotating mechanism 172. The second rotating mechanism 172 is connected with the dynamic gas flow controlling device 160, and makes the stage 110 rotate around the normal line of the surface of the stage 110. Specifically, the gas inlet-outlet devices of the sixth embodiment are formed by the pair of gas inlet-outlet devices 150k and 150l arranged oppositely. In addition, by making the stage 110 rotate around the normal line of the surface of the stage 110, the second rotating mechanism 172 can freely adjust the angle between the flow direction of the gas and the moving direction of the energy beam 140. In an embodiment, referring to FIG. 10(A), the gas inlet-outlet device 150l supplies gas and the gas inlet-outlet device 150k extracts gas. By using the second rotating mechanism 172 to make the stage 110 rotate around the normal line of the surface of the stage 110 in the counterclockwise direction, the gas can flow in an upward direction. In another embodiment, referring to FIG. 10(B), the gas inlet-outlet device 150k supplies gas and the gas inlet-outlet device 150l extracts gas. By using the second rotating mechanism 172 to make the stage 110 rotate around the normal line of the surface of the stage 110 in the clockwise direction, the gas can flow in a downward direction. By making the stage 110 rotate around the normal line of the surface of the stage 110, the angle between the flow direction of the gas and the moving direction of the energy beam 140 can be freely adjusted even though one pair of gas inlet-outlet devices are coupled. In this way, the design difficulty of the device is effectively lowered.

In the following, an additive manufacturing method of the disclosure is described.

Figure 11:
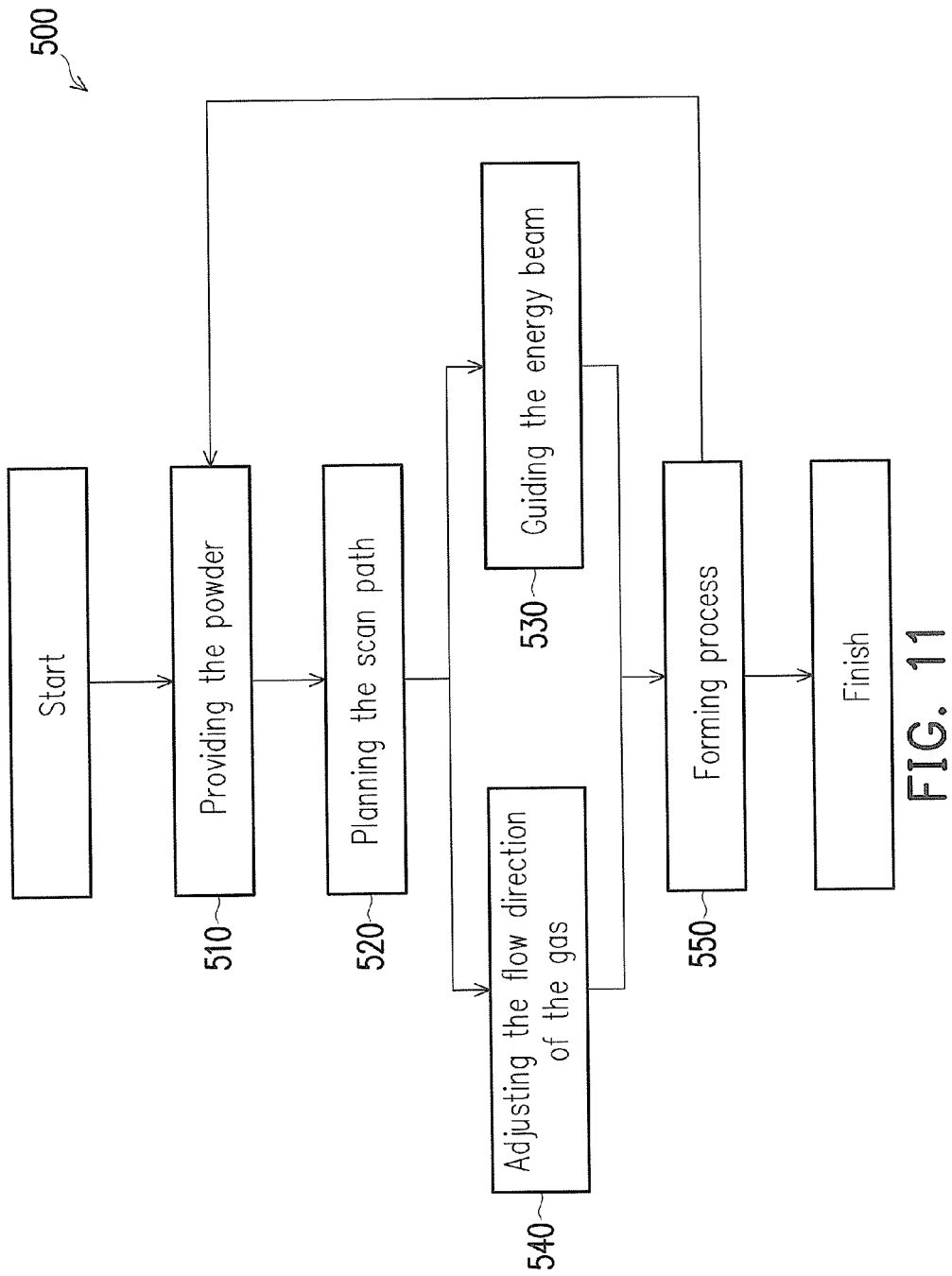
FIG. 11 is a flowchart illustrating an additive manufacturing method according to an embodiment of the disclosure.
Figure 12:
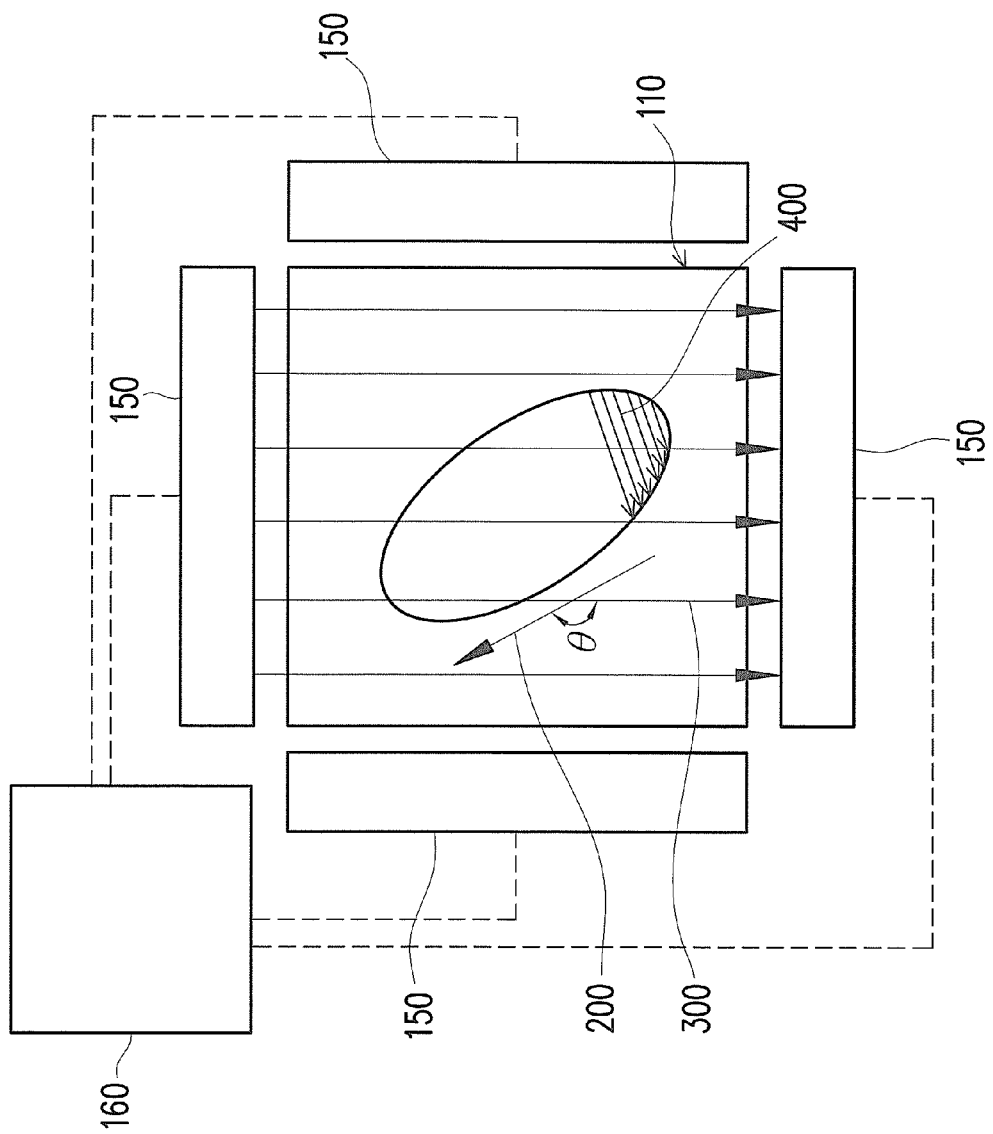
FIG. 12 is a schematic view illustrating an additive manufacturing method according to an embodiment of the disclosure.

FIG. 11 is a flowchart illustrating an additive manufacturing method 500 according to an embodiment of the disclosure. FIG. 12 is a schematic view illustrating an additive manufacturing method according to an embodiment of the disclosure.

Referring to FIGS. 1, 11, and 12, the additive manufacturing method of the disclosure includes Steps 510 to 550. At Step 510, the powder is provided to form the powder layer 130. The powder may be provided to the surface of the stage (target surface) 110 by the powder supplying device 120. The suitable types of powder that are already described in the foregoing, so details in this respect will not be reiterated below.

At Step 520, a scan path of the energy beam 140 is planned. The energy beam 140 may be generated by the energy beam generating device 122. The scan path of the energy beam 140 on the surface of the stage 110 may be determined according to the practical needs. The scan path of the energy beam 140 may be in a strip or sawtoothed shape.

At Step 530, following the scan path planned at Step 520, the energy beam 140 is directed on the powder (the powder layer 130) to form a solidified layer. The ranges concerning the energy density, scanning speed, and width of the energy beam 140 are already described in the foregoing, so details in this respect will not be reiterated below.

Before or after performing Step 530, or at the same time when Step 530 is performed, the gas may be provided to the surface of the stage 110. In an embodiment, the step of providing the gas to the surface of the stage 110 is performed as follows: providing the gas to the surface of the stage 110 from the at least one pair of gas inlet-outlet devices 150 coupled around the surface of the stage 110. The gas provided includes argon, nitrogen, helium, or a combination thereof. However, the disclosure is not limited thereto.

At Step 540, the gas may be adjusted by the atmosphere controlling module 142 to adjust the flow direction of the gas. The step of adjusting the flow direction of the gas may be achieved according to one of the following or a combination thereof: (1) dynamically controlling to turn on or off some of the gas inlet-outlet devices 150; (2) making the gas inlet-outlet devices 150 rotate around the stage 110; (3) dynamically controlling the flow direction of the gas, the flow speed of the gas, or a combination thereof; and (4) making the stage 110 rotate around the normal line of the surface of the stage 110. Specific configurations of points (1) to (4) are already described in the foregoing, so no further details in this respect will be reiterated below.

Referring to FIGS. 1 and 12, a pointing direction of an arrow 400 is a scanning direction of the energy beam 140, whereas a pointing direction of an arrow 200 is the moving direction of the energy beam 140. A pointing direction of an arrow 300 is the flow direction of the gas. The flow direction (the arrow 300) of the gas is different from the moving direction (the arrow 200) of the energy beam 140. In other words, an angle θ between the flow direction (the arrow 300) of the gas and the moving direction (the arrow 200) of the energy beam 140 is predetermined by a scanning strategy. In an embodiment of the disclosure, the angle θ between the flow direction (the arrow 300) of the gas and the moving direction (the arrow 200) of the energy beam 140 is dynamically controlled within a range of greater than 135 degrees and less than 225 degrees. In an embodiment, the flow direction (the arrow 300) and the moving direction (the arrow 200) of the energy beam 140 are opposite. In other words, the angle θ is 180 degrees. Since the flow direction (the arrow 300) of the gas and the moving direction (the arrow 200) of the energy beam 140 are different, the gas flow blows the slag and oxides toward a processing area where the melt forming process is already performed. Therefore, the slag and oxides do not fall into the processing area where the melt forming process is not performed.

At Step 550, a forming process is performed to the powder (the powder layer 130). In an embodiment, the step (Step 550) of performing the forming process to the powder (the powder layer 130) is performed in the following way: performing the selective melt forming process to the powder (the powder layer 130). The selective melt forming process includes performing a selective laser sintering (SLS) process, a selective laser melting (SLM) process, a direct metal laser sintering (DMLS) process, an electron beam melting (EBM) process, or a combination thereof.

Steps 510, 520, 530, 540, and 550 are repetitively performed until a plurality of the solidified layers accumulate into a three-dimensional product.

In the embodiments of the disclosure, by setting the angle θ within the aforesaid range, the slag and oxides falling back to the processing area where the melt forming process is not performed are effectively reduced. Therefore, the quality of product manufactured by using additive manufacturing is improved.

Based on the above, according to the additive manufacturing system and the additive manufacturing method of the disclosure, the angle between the moving direction and the flow direction of the gas can be dynamically controlled to the required range according to the needs by using the atmosphere controlling module during the process of additive manufacturing, so as to prevent slag and oxides from falling back to the processing area where the melt forming process is not performed, thereby improving the forming quality and stability of additive manufacturing.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An additive manufacturing system, comprising:
   a stage;
   a powder supplying device, providing a powder to a surface of the stage;
   an energy beam generating device, generating an energy beam and directing the energy beam to the stage; and
   an atmosphere controlling module, comprising:
      at least a pair of gas inlet-outlet devices, coupled around the stage; and a dynamic gas flow controlling device, connected to the gas inlet-outlet devices, wherein the dynamic gas flow controlling device dynamically controls an angle between a flow direction of the gas and a moving direction of the energy beam by a predetermined scanning strategy, wherein the gas inlet-outlet device comprises a plurality of blocks divided up by a plurality of movable vanes.

2. The additive manufacturing system as claimed in claim 1, wherein the dynamic gas flow controlling device comprises:
a gas inlet-outlet switch device, dynamically controlling to turn on or off the gas inlet-outlet devices.

3. The additive manufacturing system as claimed in claim 1, wherein the dynamic gas flow controlling device comprises:
a gas flow direction adjustment device, dynamically controlling a flow direction of the gas.

4. The additive manufacturing system as claimed in claim 1, wherein the dynamic gas flow controlling device comprises:
a gas flow speed adjustment device, dynamically controlling a flow speed of the gas.

5. The additive manufacturing system as claimed in claim 1, further comprising:
a first rotating mechanism, connected to the dynamic gas flow controlling device and making the gas inlet-outlet devices rotate around the stage.

6. The additive manufacturing system as claimed in claim 1, further comprising:
a second rotating mechanism, connected to the dynamic gas flow controlling device and making the stage rotate around a normal line of the surface of the stage.

7. The additive manufacturing system as claimed in claim 1, wherein the gas inlet-outlet devices are arranged to be separate or adjacent with respect to each other and in a circular, square, or polygonal arrangement.

8. The additive manufacturing system as claimed in claim 1, wherein the gas inlet-outlet devices are configured as honeycombs, grids, voids, vanes, fan blades, or a combination thereof.

9. The additive manufacturing system as claimed in claim 1, wherein the energy beam generating device performs a selective melt forming process to the powder, and the selective melt forming process comprises performing a selective laser sintering process, a selective laser melting process, a direct metal laser sintering process, an electron beam melting process, or a combination thereof.

10. An additive manufacturing method, comprising:
providing a powder onto a target surface of a stage;
irradiating the powder with an energy beam and directing the energy beam on the powder to form a solidified layer;
providing a gas to the target surface of the stage from at least one pair of gas inlet-outlet devices coupled around the stage, wherein the gas inlet-outlet device comprises a plurality of blocks divided up by a plurality of movable vanes;
dynamically controlling an angle between a flow direction of the gas and a moving direction of the energy beam, wherein the angle is predetermined by a scanning strategy; and
repetitively performing the above-mentioned steps until a plurality of the solidified layers formed accordingly accumulate into a three-dimensional product.

11. The additive manufacturing method as claimed in claim 10, wherein the step of dynamically controlling the angle between the flow direction of the gas and the moving direction of the energy beam comprises: dynamically controlling to turn on or off some of the gas inlet-outlet devices.

12. The additive manufacturing method as claimed in claim 10, wherein the step of dynamically controlling the angle between the flow direction of the gas and the moving direction of the energy beam comprises: making the gas inlet-outlet devices rotate around the stage.

13. The additive manufacturing method as claimed in claim 10, wherein the step of dynamically controlling the angle between the flow direction of the gas and the moving direction of the energy beam comprises: dynamically controlling the flow direction of the gas, a flow speed of the gas, or a combination thereof.

14. The additive manufacturing method as claimed in claim 10, wherein the step of dynamically controlling the angle between the flow direction of the gas and the moving direction of the energy beam comprises: making the stage rotate around a normal line of the surface of the stage.

15. The additive manufacturing method as claimed in claim 10, wherein the angle between the flow direction of the gas and the moving direction is greater than 135 degrees and less than 225 degrees.

16. The additive manufacturing method as claimed in claim 10, wherein the step of irradiating the powder with the energy beam and directing the energy beam on the powder comprises:
performing a selective melt forming process to the powder, wherein the selective melt forming process comprises performing a selective laser sintering process, a selective laser melting process, a direct metal laser sintering process, an electron beam melting process, or a combination thereof.

17. The additive manufacturing method as claimed in claim 10, wherein an energy density of the energy beam is in a range of 0.1 $J/mm^2$ to 100 $J/mm^2$.

18. The additive manufacturing method as claimed in claim 10, wherein a scanning speed of the energy beam is in a range of 50 mm/sec to 2,000 mm/sec.

19. The additive manufacturing method as claimed in claim 10, wherein the gas comprises argon, nitrogen, helium, or a combination thereof.

20. The additive manufacturing method as claimed in claim 10, wherein a focus light spot of the energy beam is in a range of 1 μm to 10,000 μm.

* * * * *